(12) United States Patent
Maltsev et al.

(10) Patent No.: US 7,570,953 B2
(45) Date of Patent: Aug. 4, 2009

(54) MULTICARRIER COMMUNICATION SYSTEM AND METHODS FOR LINK ADAPTATION USING UNIFORM BIT LOADING AND SUBCARRIER PUNCTURING

(75) Inventors: Alexander A. Maltsev, Nizhny Novgorod (RU); Ali S Sadri, San Diego, CA (US); Alexey E. Rubtsov, Nizhny Novgorod (RU); Alexei V Davydov, Nizhny Novgorod (RU); Andrey V. Pudeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 750 days.

(21) Appl. No.: 10/862,535

(22) Filed: Jun. 7, 2004

(65) Prior Publication Data

US 2005/0152466 A1 Jul. 14, 2005

Related U.S. Application Data

(60) Provisional application No. 60/536,071, filed on Jan. 12, 2004.

(51) Int. Cl.
 *H04W 72/00* (2006.01)
(52) U.S. Cl. .................. 455/450; 455/522; 375/260
(58) Field of Classification Search .................. 455/450, 455/454, 522; 375/222, 260
See application file for complete search history.

(56) References Cited

U.S. PATENT DOCUMENTS

| | | | |
|---|---|---|---|
| 6,430,441 B1 | 8/2002 | Levine | |
| 7,333,556 B2 | 2/2008 | Maltsev et al. | |
| 7,440,510 B2 | 10/2008 | Sandhu et al. | |
| 2001/0031014 A1* | 10/2001 | Subramanian et al. | 375/260 |
| 2001/0031016 A1* | 10/2001 | Seagraves | 375/264 |
| 2002/0009155 A1 | 1/2002 | Tzannes | |
| 2003/0043732 A1 | 3/2003 | Walton et al. | |

(Continued)

FOREIGN PATENT DOCUMENTS

EP 1240918 A2 9/2002

(Continued)

OTHER PUBLICATIONS

"Supplement to IEEE Standard for Information Technology- Telecommunications and Information Exchange Between Systems- Local and Metropolitan Area Networks—Specific Requirements- Part 11: Wireless LAN Medium Access Control (MAC) and Physical Layer (PHY) Specifications: High-Speed Physical Layer in the 5 GHZ Band", *IEEE STD 802.11A-1999*, (Dec. 30, 1999), 1-90.

(Continued)

*Primary Examiner*—Quochien B Vuong
(74) *Attorney, Agent, or Firm*—Schwegman, Lundberg & Woessner, P.A.; Gregory J. Gorrie

(57) ABSTRACT

Transmission parameters for a multicarrier communication channel are selected by setting a power level for each subcarrier of an active set of subcarriers, and calculating the channel capacity based on the power levels and effective noise powers. The number of active subcarriers of the set is decreased, the power levels are reset and the channel capacity is recalculated until a final set of active subcarriers result that provide the highest channel capacity.

28 Claims, 4 Drawing Sheets

U.S. PATENT DOCUMENTS

| | | | |
|---|---|---|---|
| 2003/0083703 | A1 | 5/2003 | Zhu et al. |
| 2003/0125040 | A1* | 7/2003 | Walton et al. ............... 455/454 |
| 2003/0139196 | A1 | 7/2003 | Medvedev et al. |
| 2003/0204210 | A1 | 10/2003 | Ousdigian et al. |
| 2003/0208241 | A1 | 11/2003 | Bradley et al. |
| 2003/0223354 | A1* | 12/2003 | Olszewski ................. 370/208 |
| 2004/0258174 | A1 | 12/2004 | Shao et al. |
| 2005/0031047 | A1 | 2/2005 | Maltsev et al. |
| 2005/0088959 | A1 | 4/2005 | Kadous |
| 2005/0141412 | A1 | 6/2005 | Sadri et al. |
| 2005/0152465 | A1 | 7/2005 | Maltsev et al. |
| 2005/0215264 | A1 | 9/2005 | Subramaniam et al. |
| 2005/0245197 | A1 | 11/2005 | Kadous et al. |
| 2006/0087972 | A1 | 4/2006 | Jalali et al. |
| 2006/0166634 | A1 | 7/2006 | Ido |

FOREIGN PATENT DOCUMENTS

| | | |
|---|---|---|
| EP | 1411647 A2 | 4/2004 |
| GB | 2384651 | 7/2003 |
| WO | WO-03/001702 A1 | 1/2003 |
| WO | WO-03/047198 A2 | 6/2003 |
| WO | WO-2004/047354 A1 | 6/2004 |
| WO | WO-2005/067171 A1 | 7/2005 |
| WO | WO-2005/071912 A1 | 8/2005 |
| WO | WO-2005/122515 A1 | 12/2005 |

OTHER PUBLICATIONS

Bangerter, B., et al., "High-Throughput Wireless LAN Air Interface", *Intel Technology Journal*, 7 (3), http://developer.intel.com/technology/itj/index.htm, (Aug. 19, 2003), 47-57.

Choi, B., et al., "Optimum Mode-Switching-Assisted Constant-Power Single- and Multicarrier Adaptive Modulation", *IEEE Transactions on Vehicular Technology*, 52(3), (May 2003), 536-560.

Dammann, A., et al., "Transmit/Receive—Antenna—Diversity Techniques For OFDM Systems", *European Transactions on Telecommunications*, 13 (5), Multi-Carrier Spread-Spectrum and Related Topics, (2002), 531-538.

Fujino, Y., et al., "Transmitter With Antenna Array For MC-CDMA Forward Link", *IEEE Antennas and Propagation Society International Symposium*, (Jun. 22, 2003), 847-850.

Hutter, A. A., et al., "Effects of Fading Correlation on Multiple Antenna Reception Mobile OFDM Systems", *IEEE Vehicular Technology Conference*, (Sep. 24, 2000), 2744-2749.

Sandhu, S., et al., "Analog Combining of Multiple Receive Antennas With OFDM", *IEEE International Conference on Communications*, (May 11, 2003), 3428-3432.

Simoens, S., et al., "Optimum Performance of Link Adaptation in HIPERLAN/2 Networks", *IEEE 53rd Vehicular Technology Conference (VTC 2001)*, vol. 2 of 4, (May 6-9, 2001), 1129-1133.

Slimane, B. S., "A Low Complexity Antenna Diversity Receiver For OFDM Based Systems", *IEEE International Conference on Communications*, (Jun. 6, 2001), 1147-1151.

Tian, Q., et al., "The Performance of Multi-Carrier CDMA with Base Station Antenna Arrays in Fading Channels", *Vehicular Technology Conference*, (May 15, 2000), 1498-1502.

Yih, C.-H., et al., "Adaptive Modulation, Power Allocation and Control for OFDM Wireless Networks", *Personal, Indoor and Mobile Radio Communication*, 2, (2000), 809-813.

Yuan, H., et al., "An Adaptive Array Antenna with Path Selection of OFDM Signal", *European Personal Mobile Communications Conference.*, (Apr. 22, 2003), 412-416.

Zhen, L., et al., "A Modified Sub-Optimum Adaptive Bit and Power Allocation Algorithm in Wideband OFDM System", *CCECE 2003 Canadian Conference on Electrical and Computer Engineering.* vol. 3 of 3, (May 4, 2003), 1589-1592.

Abdul Aziz, M. K., et al., "Indoor throughput and range improvements using standard compliant AP antenna diversity in IEEE 802.11a and ETSI HIPERLAN/2", *VTC 2001 Fall. IEEE VTS 54th Vehicular Technology Conference*, 2001, vol. 4, (Oct. 7-11, 2001),2294-2298.

Cioffi, John M., "Lectures on Digital Communications", *Stanford University*, Available from http://www.stanford.edu/class/ee379c/ ,(2001),278-314.

Leke, A, et al., "A maximum rate loading algorithm for discrete multitone modulation systems", *GLOBECOM '97, Global Telecommunications Conference*, 1997, vol. 3, (Nov. 8, 1997), 1514-1518.

"International Search Report for corresponding PCT Application No. PCT/US2005/017773", (Sep. 13, 2005), 3 pgs.

Yih, C. H., et al., "Adaptive Modulation, Power Allocation and Control for OFDM Wireless Networks", *The 11th IEEE International Symposium on Personal, Indoor and Mobile Radio Communication*, 2, (Sep. 18, 2000), 809-813.

"U.S. Appl. No. 10/749,903 Non-Final Office Action mailed Jan. 25, 2008", 33 pgs.

"U.S. Appl. No. 10/880,158 Second Supplemental Preliminary Amendment filed Jan. 29, 2008", 9 pgs.

"U.S. Appl. No. 10/815,035 Notice of Allowance mailed Sep. 25, 2007," 10 pgs.

"U.S. Appl. No. 10/880,158 Preliminary Amendment filed Jul. 29, 2004", 3 pgs.

"U.S. Appl. No. 10/880,158 Supplemental Preliminary Amendment filed Nov. 18, 2004", 3 pgs.

"Written Opinion for corresponding PCT Application No. PCT/US2004/043056", (Apr. 1, 2005), 9 pgs.

* cited by examiner

| INDEX | DATA RATE | MODULATION | CODE RATE |
|---|---|---|---|
| 1 | 6 | BPSK | 1/2 |
| -- | 8 | BPSK | 2/3 |
| 2 | 9 | BPSK | 3/4 |
| 3 | 12 | QPSK | 1/2 |
| -- | 16 | QPSK | 2/3 |
| 4 | 18 | QPSK | 3/4 |
| 5 | 24 | 16 QAM | 1/2 |
| -- | 32 | 16 QAM | 2/3 |
| 6 | 30 | 16 QAM | 3/4 |
| -- | 40 | 32 QAM | 1/2 |
| -- | 45 | 32 QAM | 2/3 |
| -- | 36 | 32 QAM | 3/4 |
| -- | 48 | 64 QAM | 1/2 |
| 7 | 54 | 64 QAM | 2/3 |
| 8 | 42 | 64 QAM | 3/4 |
| -- | 56 | 128 QAM | 1/2 |
| -- | 36 | 128 QAM | 2/3 |
| -- | 63 | 128 QAM | 3/4 |
| -- | 48 | 256 QAM | 1/2 |
| -- | 64 | 256 QAM | 2/3 |
| -- | 72 | 256 QAM | 3/4 |

Fig. 4

MULTICARRIER COMMUNICATION SYSTEM AND METHODS FOR LINK ADAPTATION USING UNIFORM BIT LOADING AND SUBCARRIER PUNCTURING

CROSS-REFERENCE TO RELATED APPLICATIONS

This application claims the benefit of priority under 35 U.S.C. 119(e) to U.S. Provisional Patent Application Ser. No. 60/536,071, filed Jan. 12, 2004, which is incorporated herein by reference.

TECHNICAL FIELD

Embodiments of the present invention pertain to electronic communication. Some embodiments pertain to wireless networks using multicarrier communication signals.

BACKGROUND

Communication stations desirably adapt their communications to changing channel conditions to achieve better usage of the channel's capacity. One problem with some conventional communication stations is that a significant amount of feedback between a receiving station and a transmitting station is generally required to optimize channel throughput. This feedback consumes channel bandwidth and requires significant processing by the communication stations. Thus, there are general needs for communication stations and methods for adapting to channel conditions that help maximize use of the channel capacity while helping to minimize feedback.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIG. 4 is a data-rate table in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention may be referred to, individually or collectively, herein by the term "invention" merely for convenience and without intending to voluntarily limit the scope of this application to any single invention or inventive concept if more than one is in fact disclosed.

Figure 1:
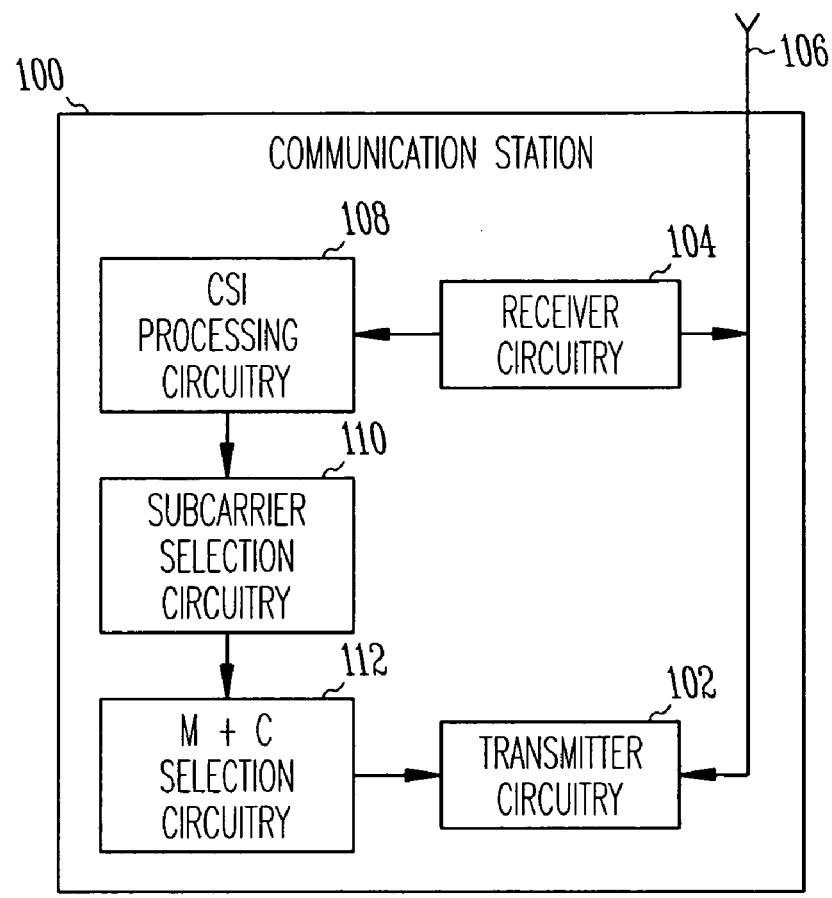
FIG. 1 is a block diagram of a multicarrier communication station in accordance with some embodiments of the present invention.

FIG. 1 is a block diagram of a multicarrier communication station in accordance with some embodiments of the present invention. Multicarrier communication station 100 may be a wireless communication device and may transmit and/or receive wireless communications signals with transmitter circuitry 102 and/or receiver circuitry 104 using one or more antennas 106. In some embodiments, multicarrier communication station 100 may communicate multicarrier signals, such as orthogonal frequency division multiplexed (OFDM) communication signals, although the scope of the invention is not limited in this respect.

In accordance with some embodiments, multicarrier communication station 100 may comprise subcarrier selection circuitry 110 to select active subcarriers of the multicarrier communication channel based on channel information provided by channel state information (CSI) processing circuitry 108. In some embodiments, multicarrier communication station 100 may also comprise modulation level and coding rate (M+C) selection circuitry 112 to select at least one of a modulation level and a coding rate for communications using the active subcarriers. In some embodiments, modulation level and coding rate selection circuitry 112 may select a modulation level and coding rate combination based on channel information and a power level selected for the active subcarriers by subcarrier selection circuitry 110.

In some embodiments, subcarrier selection circuitry 110 may select less than all data subcarriers of a multicarrier channel as active subcarriers. In some embodiments, this may be referred to a subcarrier puncturing because the subcarriers that are not selected are not used for transmission.

In some embodiments, the number of active subcarriers as well as the power level, modulation level and/or coding rate for the active subcarriers of a multicarrier channel may be selected to help maximize channel capacity based on current channel conditions, although the scope of the invention is not limited in this respect. This is described in more detail below.

In some embodiments, channel state information processing circuitry 108 may determine channel state information from communications received from a transmitting station. In some embodiments, communication station 100, as a receiving station, may determine the channel state information from channel estimates and noise power estimates performed on a request-to-send (RTS) packet. In these embodiments, the receiving station may send transmission instructions to the transmitting station in a clear-to-sent (CTS) packet. The transmitting station may responsively transmit at least portions of a data packet to the receiving station in accordance with the transmission instructions. In these embodiments, the transmission instructions may identify the active subcarriers, and may indicate the selected power level as well as the selected modulation level and/or the selected coding rate.

In some embodiments, channel state information may comprise one or more of a channel transfer function, or estimate thereof, one or more radio-frequency (RF) signal characteristics, and/or one or more channel quality parameters. In some embodiments, channel state information may include a channel transfer function estimate in the frequency or time domain. In some embodiments, channel state information may include one or more RF channel performance indicators such as signal-to-noise ratio (SNR), signal-to-interference and noise ratio (SINR), a received signal strength indication (RSSI), and the like. In some embodiments, channel state information may also include one or more channel quality parameters associated with information decoded from a received signal.

In some embodiments, multicarrier communication station 100 may be referred to as a receiving station, and in some embodiments, communication station 100 may be referred to as a transmitting station. The term transmitting station refers to the station that is to transmit payload data, while the term receiving station refers to the station that is to receive the payload data. In general, both transmitting and receiving stations may transmit and receive packets.

In some embodiments, multicarrier communication station 100 may communicate with one or more other communication stations over a multicarrier communication channel. In some embodiments, the multicarrier communication channel may comprise either a standard-throughput channel or a high-throughput communication channel. In these embodiments, the standard-throughput channel may comprise one subchannel and the high-throughput channel may comprise a combination of one or more subchannels and one or more spatial channels associated with each subchannel. Spatial channels may be non-orthogonal channels (i.e., not separated in frequency) associated with a particular subchannel in which orthogonality may be achieved through beamforming and/or diversity.

In some embodiments, a wideband channel may comprise up to four or more subchannels having bandwidths of approximately 20 MHz, and each of the subchannels may have up to 48 or more orthogonal data subcarriers having a spacing therebetween of approximately 312.5 kHz, although the scope of the invention is not limited in this respect.

In some embodiments, the frequency spectrums for a multicarrier communication channel may include either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier communication station 100 may be part of a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier communication station 100 may transmit and/or receive RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although device 100 may also be suitable to transmit and/or receive communications in accordance with other techniques including the Digital Video Broadcasting Terrestrial (DVB-T) broadcasting standard, and the High performance radio Local Area Network (HiperLAN) standard.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Antennas 106 may comprise one or more of a directional or omnidirectional antenna, including, for example, a dipole antenna, a monopole antenna, a loop antenna, a microstrip antenna or other type of antenna suitable for reception and/or transmission of RF signals.

Although multicarrier communication station 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Figure 2:
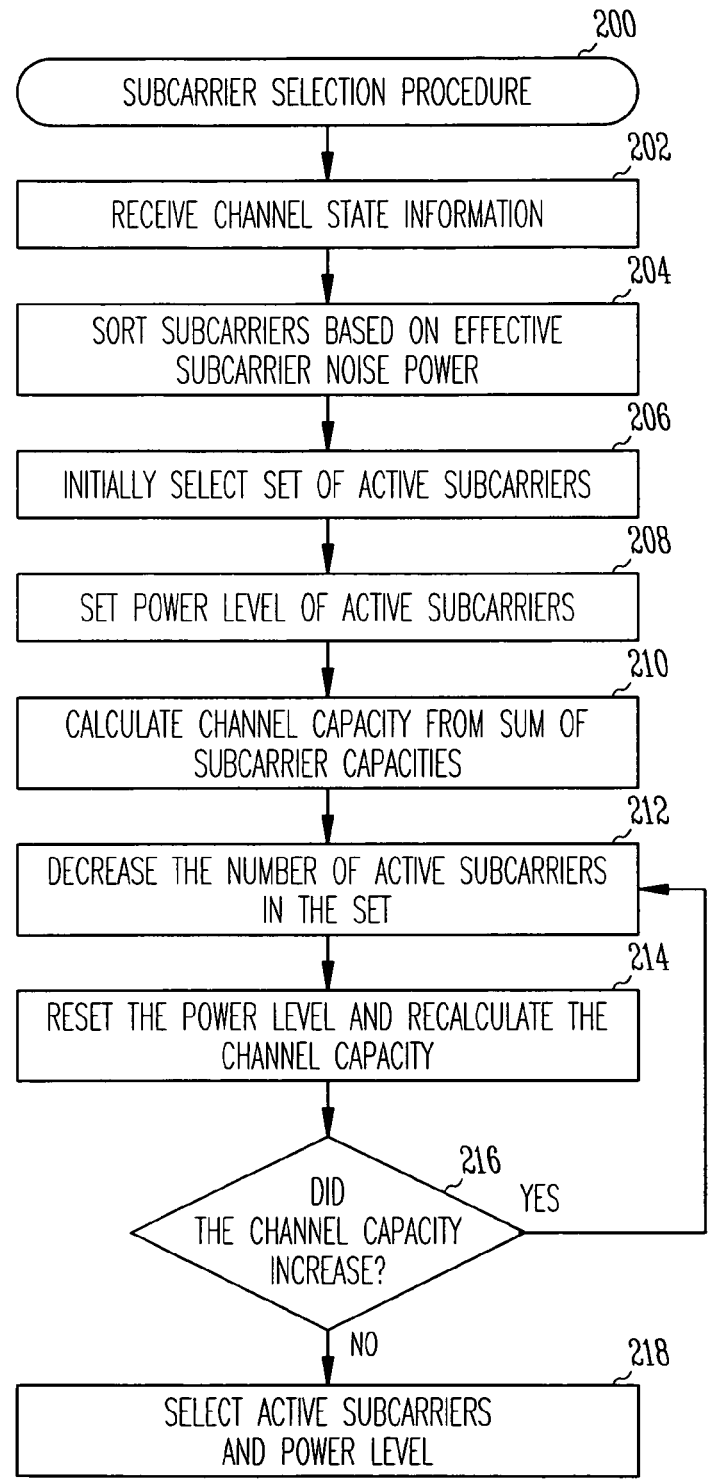
FIG. 2 is flow chart of a subcarrier selection procedure in accordance with some embodiments of the present invention.

FIG. 2 is flow chart of a subcarrier selection procedure in accordance with some embodiments of the present invention. Subcarrier selection procedure 200 may be used to select active subcarriers of a multicarrier communication channel for subsequent communications. In some embodiments, subcarrier selection procedure 200 may also determine a power level for the active subcarriers. In some embodiments, the active subcarriers may be viewed as being turned on and the subcarriers that are not active may be viewed as being turned off or punctured. In some embodiments, subcarrier selection procedure 200 may be performed by subcarrier selection circuitry 110 (FIG. 1), although the scope of the invention is not limited in this respect.

Operation 202 comprises receiving channel state information for the multicarrier communication channel. The channel state information may be received from channel state information processing circuitry 108 (FIG. 1), and may comprise at least an effective subcarrier noise power for each subcarrier of the multicarrier communication channel. In some embodiments, channel state information processing circuitry 108 (FIG. 1) may determine the channel state information from channel estimates and noise power estimates performed on a received packet. In some embodiments, effective subcarrier noise power may be an amount of additive noise power on the subcarrier divided by the square of the magnitude of a channel transfer function for that subcarrier. The additive noise power may be caused by the receiver circuitry's internal noise as well as external interference. In some embodiments, channel state information processing circuitry 108 (FIG. 1) may estimate the effective subcarrier noise power directly during receipt of a packet, although the scope of the invention is not limited in this respected.

Operation 204 comprises sorting the subcarriers of the multicarrier communication channel based on their effective noise power.

Operation 206 comprises initially selecting a set of active subcarriers. In some embodiments, all subcarriers of the multicarrier communication channel may be initially selected. In other embodiments, the subcarriers that have an effective subcarrier noise power below a predetermined threshold may be selected to be in the active set.

Operation 208 comprises setting the power level for the active subcarriers. In some embodiments, operation 208 may comprise setting the power level of each subcarrier of the active set to a total transmit power divided by the number of the active subcarriers. The total transmit power ($P_{total}$) may be an actual transmit power level used by a transmitting station for transmitting a current packet to the receiving station. In some embodiments, the total transmit power may be provided to the receiving station in a service field of the current packet, although the scope of the invention is not limited in this respect.

In some embodiments, operation 208 may comprise setting the power level of each subcarrier of the active set based on a transmitter power budget ($P_{max}$) divided by the number of the active subcarriers. The transmitter power budget may be an available maximal transmitter power that may be used by a transmitting station. In some embodiments, the transmitter power budget ($P_{max}$) may be provided to the receiving station in a service field of the current packet, although the scope of the invention is not limited in this respect.

In some embodiments, operation 208 may comprise setting the power level of each subcarrier of the active set based on a new requested total transmit power ($P^{req}_{total}$) divided by the number of the active subcarriers. New requested total transmit power ($P^{req}_{total}$) may be calculated by the receiving station on the basis of the actual total transmit power and transmitter power budget ($P_{max}$) provided to the receiving station in a service field of the current packet on the principle of throughput maximization, power saving, and/or interference (for other stations) minimization, although the scope of the invention is not limited in this respect.

In some embodiments, the total transmit power used by a transmitting station for transmitting a current packet to the receiving station and/or the transmitter power budget ($P_{max}$) may be unknown to the receiving station. In these embodiments, the power level of the subcarriers of the active set may be set in relative values to these possibly parameters.

In some embodiments, operation 208 may comprise setting the power level of each subcarrier of the active set based on (e.g., so as not to exceed) a maximum power spectral density. The maximum power spectral density may be predetermined by a regulating authority. In some embodiments, when the power levels of the subcarriers are set based on the total transmit power ($P_{total}$) and/or the transmitter power budget ($P_{max}$), the power levels may be set so as not to exceed the maximum power spectral density, although the scope of the invention is not limited in this respect. In some embodiments, the predetermined maximum power spectral density may be determined by a regulating authority, such as the Federal Communications Commission (FCC) in the United States, although the scope of the invention is not limited in this respect.

Operation 210 comprises calculating a channel capacity based on the power level selected in operation 208 and the effective subcarrier noise power for each active subcarrier. In some embodiments, operation 210 may calculate the channel capacity by summing individual subcarrier capacities of each subcarrier in the active set. In some embodiments, the individual subcarrier capacities may be calculated based on the selected power level divided by an effective subcarrier noise power squared for an associated subcarrier of the active set. In some embodiments, the channel capacity may be calculated based on the following equation:

Channel capacity=$\Delta F \cdot \Sigma \log_2(1+(P_n/\sigma_n^2)/\Gamma)$

In this expression, the summation is performed for each subcarrier of the active set (i.e., active subcarriers one through n), "$\Delta F$" represents a subcarrier frequency spacing, "$P_n$" represents the selected power level for the $n^{th}$ subcarrier, "$\sigma_n^2$" represents the effective subcarrier noise power for the $n^{th}$ subcarrier, and "$\Gamma$" represents predetermined subcarrier signal-to-noise ratio gap.

Operation 212 comprises decreasing the number of active subcarriers in the set. In some embodiments, the subcarrier having the worst (i.e., highest) effective subcarrier noise power may be removed from the set of active subcarriers. The subcarrier having the worst effective subcarrier noise power may be based on the sorted subcarriers from operation 204.

Operation 214 comprises resetting the power level of the active subcarriers remaining in the set and recalculating the channel capacity. In operation 214, the total amount of power may be allocated among the remaining subcarriers of the active set.

Operation 216 compares the recalculated channel capacity with the channel capacity that was calculated prior to decreasing the number of active subcarriers in operation 212. When the channel capacity does not increase, operation 218 is performed. When the channel capacity increases, operations 212 and 214 may be repeated until the channel capacity no longer increases to determine the final set of active subcarriers. In some embodiments, the final set of active subcarriers may provide a highest calculated channel capacity, although the scope of the invention is not limited in this respect.

In some embodiments, the power level of the remaining active subcarriers may be increased in operation 214 so as not to exceed the predetermined maximum power spectral density resulting during the transmission of all active subcarriers. In some embodiments, to determine the final set of active subcarriers, the next worst subcarrier may be removed in operation 212 from the active set and the power level of the remaining active subcarriers may be increased in operation 214. The increased power level may increase the capacity of the individual subcarriers remaining in the active set which may provide an increase in the overall channel capacity. In some embodiments, a subcarrier may be removed from the active set until the channel capacity no longer increases.

In operation 218, the final set of active subcarriers determined in operation 212 is selected along with the power level set in operation 214.

In some embodiments, the number of active subcarriers may be adjusted (either in operation 212 operation 212) based on interleaving requirements and/or the ability to adjust interleaving parameters. For example, in some embodiments, subcarriers may be punctured (i.e., turned off) in groups so that a block interleaving scheme may reduce a number of rows (or columns) of its interleaver matrix by a whole number, such as one. In some embodiments, the number of subcarriers in a group may be based on the bit separation achieved by the interleaver. For example, in a multicarrier communication system with forty-eight data subcarriers where an interleaver uses a matrix of sixteen columns and $3 \times N_{bpsc}$ (three times the number of bits per subcarrier) rows, the adjacent bit separation may be three, so groups of three subcarriers may be turned off which may reduce the number of columns of the interleaver matrix by one.

In some embodiments, when the total transmit power ($P_{total}$) used by a transmitting station for transmitting a current packet to the receiving station and/or the transmitter power budget ($P_{max}$) are unknown to the receiving station, the power level of the subcarriers of the active set may be set in relative values to these possibly unknown parameters and the receiving station provide a recommended power level for the subcarriers to the transmitter in operation 218. In some embodiments, the number of active subcarriers, the power level, modulation level and coding rate may all be optimized together. This is discussed in more detail below.

Figure 3:
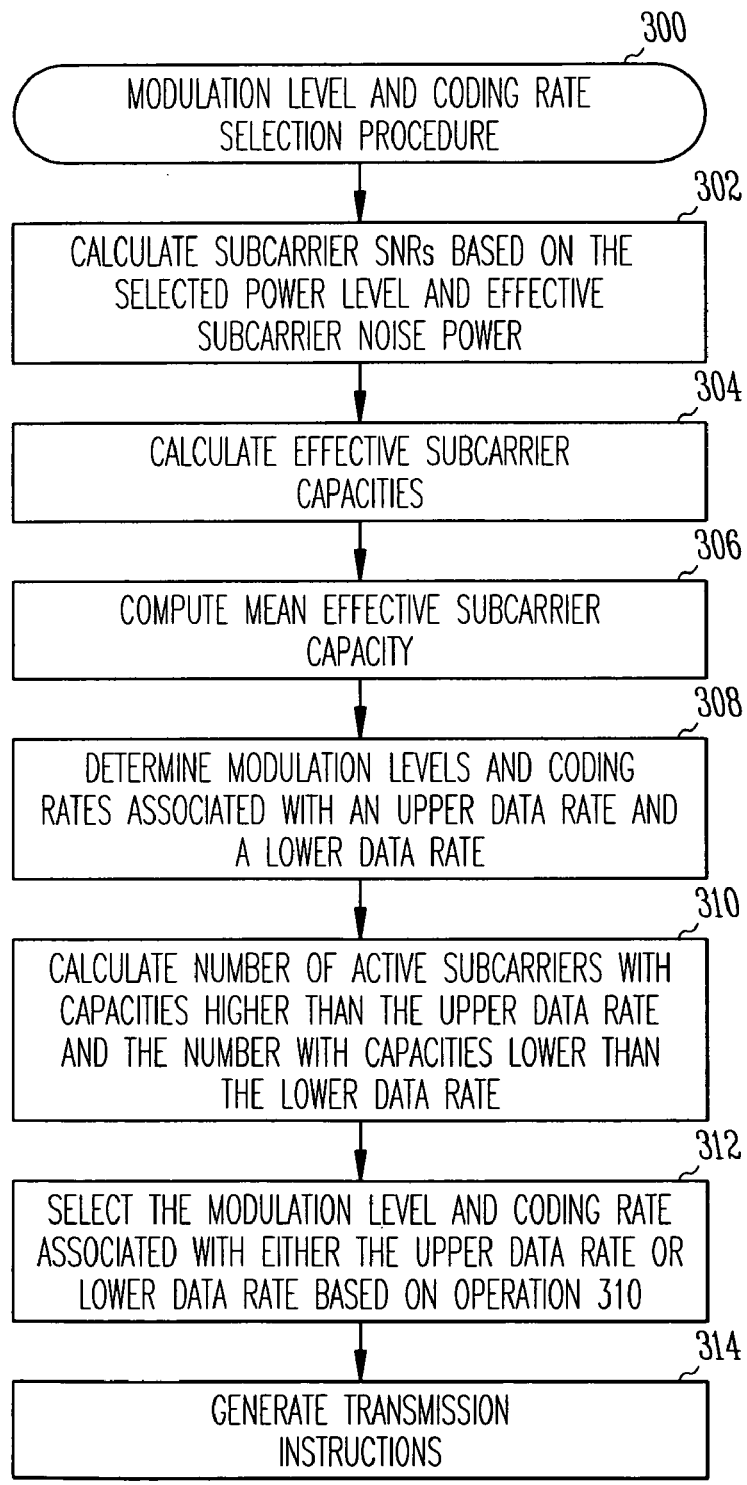
FIG. 3 is a flow chart of a modulation level and coding rate selection procedure in accordance with some embodiments of the present invention.

FIG. 3 is a flow chart of a modulation level and coding rate selection procedure in accordance with some embodiments of the present invention. Modulation level and coding rate selection procedure 300 may be used to select a modulation level and/or a coding rate to help maximize channel throughput using the active subcarriers determined in procedure 200 (FIG. 2) and the power level determined in procedure 200 (FIG. 2). In some embodiments, procedure 300 may select the same modulation level and/or coding rate for all active subcarriers (i.e., referred to as uniform bit loading), although the scope of the invention is not limited in this respect. In some embodiments, modulation level and coding rate selection circuitry 112 (FIG. 1) may be used to perform procedure 300, although the scope of the invention is not limited in this respect. In some embodiments, procedure 300 may select the modulation level and/or the coding rate for the active subcarriers based on the most recently calculated channel capacity and power level.

In some embodiments, the same power level, modulation level and coding rate may be selected for the active subcarriers, while inactive subcarriers may be turned-off. In other embodiments, the same modulation level and coding rate may be selected for the active subcarriers, however different power levels may be selected for the active subcarriers corresponding to difference frequency subchannels or spatial channels, for example, based on the active subcarriers' noise power level, or to help maximize throughput and/or channel capacity, although the scope of the invention is not limited in this respect. In yet other embodiments, different power levels, modulation levels and/or coding rates may be selected for the active subcarriers to help maximize throughput or channel capacity, although the scope of the invention is not limited in this respect.

Operation 302 comprises calculating a subcarrier signal-to-noise ratio for each active subcarrier based on the selected power level and the effective subcarrier noise power for an associated subcarrier. The selected power level may have been finally determined in operation 218 (FIG. 2) of procedure 200 (FIG. 2).

Operation 304 comprises calculating an effective subcarrier capacity for each active subcarrier based on the calculated subcarrier signal-to-noise ratio for an associated subcarrier. The effective subcarrier capacities do not necessarily correspond to the effective subcarrier capacities used in operation 204 (FIG. 2). In some embodiments, the effective subcarrier capacity for each active subcarrier may be substantially calculated by multiplying a subcarrier frequency spacing by a logarithm of one plus the signal to noise ratio (SNR) for the associated active subcarrier divided by a predetermined subcarrier SNR gap, although the scope of the invention is not limited in this respect. The predetermined subcarrier SNR gap of operation 304 does not necessarily correspond to the predetermined subcarrier SNR gap used in operation 214 (FIG. 2). In some embodiments, the effective subcarrier capacity for an individual active subcarrier may be calculated using the following expression:

Effective subcarrier capacity $C_k = \Delta F \cdot \log_2(1 + \gamma_k / \Gamma)$ In this expression, the effective subcarrier capacity $C_k$ may be calculated for each subcarrier of the active set (i.e., active subcarriers one through k), "$\Delta F$" represents a subcarrier frequency spacing, "$\gamma_k$" represents a signal-to-noise ratio for the $k^{th}$ subcarrier, and "$\Gamma$", represents predetermined subcarrier signal-to-noise ratio gap.

Operation 306 comprises calculating a mean effective subcarrier capacity based on effective subcarrier capacities for the active subcarriers. In some embodiments, operation 306 may compute the average of the effective subcarrier capacities calculated in operation 304.

Operation 308 comprises selecting a modulation level and coding rate combination for the subcarriers of the active set that provides a data rate close or closest to the mean effective subcarrier capacity. In some embodiments, operation 308 comprises selecting the modulation level and the coding rate for the subcarriers of the active set comprises by determining a modulation level and coding rate that provides a data rate per subcarrier (i.e., the number of information bits per second per subcarrier) at least slightly greater than the mean effective subcarrier capacity (i.e., an upper data rate). In these embodiments, operation 308 also comprises determining a modulation level and coding rate that provides a data rate per subcarrier (i.e., the number of information bits per second per subcarrier) at least slightly less than the mean effective subcarrier capacity (i.e., a lower data rate).

In some embodiments, the modulation levels comprise binary phase shift keying (BPSK), quadrature phase shift keying (QPSK), 8PSK, 16-quadrature amplitude modulation (16-QAM), 32-QAM, 64-QAM, 128-QAM, and 256-QAM. In some embodiments, the code rates comprise forward error correction (FEC) code rates of ½, ⅔, ¾, ⅝ and ⅞ Examples of some modulation level and code rate combinations for various data rates are illustrated in FIG. 4.

Operation 310 comprises calculating a first number of the active subcarriers with capacities higher than the upper data rate. Operation 310 also comprises calculating a second number of the active subcarriers with capacities lower than the lower data rate.

Operation 312 comprises selecting the modulation level and the coding rate associated with the upper data rate when a difference between the first and second numbers calculated in operation 310 is greater than a predetermined percentage of the active subcarriers. Operation 312 also comprises selecting the modulation level and the coding rate associated with the lower data rate when a difference between the first and second numbers is less than or equal to a predetermined percentage of the active subcarriers.

Operation 314 generates transmission instructions. In some embodiments, the transmission instructions may identify the active subcarriers (or groups of active subcarriers) selected in procedure 200 (FIG. 2), the power level selected in procedure 200 (FIG. 2) and the modulation level and coding rate selected in operation 312. In some embodiments, the transmission instructions may identify the punctured subcarriers or groups of puncture subcarriers, although the scope of the invention is not limited in this respect. In some embodiments, the power level selected in procedure 200 (FIG. 2) may be identified in absolute values (e.g., in dBm), while in other embodiments, the power level may be identified in relative values to the actual transmit power level used for transmitting a current packet. In some embodiments, the transmission instructions may identify individual power levels for each of the active subcarriers or groups of active subcarriers, although the scope of the invention is not limited in this respect. In some embodiments, the transmission instructions may identify individual modulation levels and/or coding rates for each of the active subcarriers or groups of the active subcarriers, although the scope of the invention is not limited in this respect. In some embodiments, a receiving station may send the transmission instructions to a transmitting station in a clear-to-sent (CTS) packet, although the scope of the invention is not limited in this respect.

In some embodiments, procedures 200 (FIG. 2) and 300 may be performed on a regular basis. In some embodiments, procedures 200 (FIG. 2) and 300 may be performed on a per packet basis to determine communication parameters for a next packet, although the scope of the invention is not limited in this respect. In some embodiments, procedures 200 (FIG. 2) and 300 may be performed often enough to take into account the time variance of the channel.

Although the individual operations of procedures 200 (FIG. 2) and 300 are illustrated and described as separate operations, one or more of the individual operations may be performed concurrently, and nothing requires that the operations be performed in the order illustrated.

FIG. 4 is a data-rate table in accordance with some embodiments of the present invention. Column 402 of table 400 lists examples of possible data rates (in bits per second), column 404 lists modulation types and column 406 lists forward error correction (FEC) code rates. For any particular row, the data rate of column 402 may correspond with the associated modulation and code rate of columns 404 and 406 respectively. In some embodiments, more or fewer data rates than those illustrated in table 400 may be used. The data rates that are assigned indices in column 408 are examples of possible data rates that may be selected for use in operation 308 (FIG. 3). In some embodiments, other data rates may be assigned indices, and there is no requirement that only eight indices are used.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method comprising:
    selecting a set of active subcarriers of a multicarrier communication channel;
    setting a power level for each subcarrier of the set based on a number of the active subcarriers;
    calculating a channel capacity based on the power level and an effective subcarrier noise power for each active subcarrier;
    decreasing the number active subcarriers in the set and re-performing the setting and calculating to determine a final set of active subcarriers that provide a highest calculated channel capacity; and
    selecting a modulation level and a coding rate for the subcarriers of the active set by:
    calculating a mean effective subcarrier capacity based on effective subcarrier capacities for the active subcarriers;
    determining a first modulation level and first coding rate that provides an upper data rate at least slightly greater than the mean effective subcarrier capacity;
    determining a second modulation level and second coding rate that provides a lower data rate at least slightly less than the mean effective subcarrier capacity;
    calculating a first number of the active subcarriers with capacities higher than the upper data rate;
    calculating a second number of the active subcarriers with capacities lower than the lower data rate;
    selecting the first modulation level and the first coding rate associated with the upper data rate when a difference between the first and second numbers is greater than a predetermined percentage of the active subcarriers; and
    selecting the second modulation level and the second coding rate associated with the lower data rate when a difference between the first and second numbers is less than or equal to a predetermined percentage of the active subcarriers.

2. The method of claim 1 wherein setting the power level further comprises increasing the power level of each active subcarrier after removing one or more subcarriers from the active set to maintain a predetermined power-spectral density.

3. The method of claim 2 further comprising sorting the subcarriers based on an effective subcarrier noise power, and
    wherein decreasing the number of active subcarriers in the set comprises removing one of the subcarriers having the next greatest effective subcarrier noise power from the set of active subcarriers prior to resetting the power levels of the remaining subcarriers and recalculating the channel capacity.

4. The method of claim 3 further comprising initially selecting subcarriers for the active set having an effective subcarrier noise power below a predetermined threshold.

5. The method of claim 2 further comprising initially selecting substantially all subcarriers to be in the set of active subcarriers.

6. The method of claim 2 wherein setting comprises setting the power level of each subcarrier of the active set to a total transmit power divided by the number of the active subcarriers, the total transmit power being an actual transmit power level used for transmitting a current packet.

7. The method of claim 2 wherein setting comprises setting the power level of each subcarrier of the active set based on a transmitter power budget divided by the number of the active subcarriers, the transmitter power budget being an available transmitter power of a transmitting station.

8. The method of claim 2 wherein setting comprises setting the power level of each subcarrier of the active set based on a maximum power spectral density, wherein the maximum power spectral density is predetermined by a regulating authority.

9. The method of claim 1 wherein calculating the channel capacity comprises summing individual subcarrier capacities of each subcarrier in the active set, wherein the individual subcarrier capacities are calculated based on the set power level divided by an effective subcarrier noise power for an associated subcarrier of the active set.

10. The method of claim 1 wherein the multicarrier communication channel comprises either a standard-throughput channel or a high-throughput communication channel, the standard-throughput channel comprising one subchannel, the high-throughput channel comprising a combination of one or more subchannels and one or more spatial channels associated with each subchannel.

11. The method of claim 10 wherein when the multicarrier communication channel is a high-throughput communication channel, the one or more spatial channels and the one or more subchannels are provided by one or more transmit antennas of a transmitting station.

12. The method of claim 10 wherein the subcarriers of an associated subchannel have a null at substantially a center frequency of the other subcarriers to achieve substantial orthogonality between the subcarriers of the associated subchannel.

13. A multicarrier communication station comprising:
radio frequency circuitry to communicate radio frequency signals over a multicarrier communication channel comprising a plurality of subcarriers; and
subcarrier selection circuitry to select a set of active subcarriers of the plurality by decreasing a number of the active subcarriers in the set and increasing a power level of remaining active subcarriers of the set to achieve a highest channel capacity,
wherein the subcarrier selection circuitry, as part of selecting the set of active subcarriers, is configured to:
calculate a mean effective subcarrier capacity based on effective subcarrier capacities for the active subcarriers;
determine a first modulation level and first coding rate that provides an upper data rate at least slightly greater than the mean effective subcarrier capacity;
determine a second modulation level and second coding rate that provides a lower data rate at least slightly less than the mean effective subcarrier capacity;
calculate a first number of the active subcarriers with capacities higher than the upper data rate;
calculate a second number of the active subcarriers with capacities lower than the lower data rate;
select the first modulation level and the first coding rate associated with the upper data rate when a difference between the first and second numbers is greater than a predetermined percentage of the active subcarriers; and
select the second modulation level and the second coding rate associated with the lower data rate when a difference between the first and second numbers is less than or equal to a predetermined percentage of the active subcarriers.

14. The communication station of claim 13 wherein the subcarrier selection circuitry sets the power level for active subcarriers based on a number of the active subcarriers, calculates a channel capacity based on the power level and an effective subcarrier noise power for each active subcarrier, removes an active subcarrier from the set, increases the power level of the remaining active subcarriers to maintain a predetermined power-spectral density and recalculates the channel capacity to determine a final set of active subcarriers that provide the highest calculated channel capacity.

15. The communication station of claim 14 wherein the subcarrier selection circuitry sorts the subcarriers based on an effective subcarrier noise power, and removes one of the subcarriers having the next greatest effective subcarrier noise power from the set of active subcarriers prior to the increase of the power levels of the remaining subcarriers and the recalculation of the channel capacity.

16. The communication station of claim 15 wherein the subcarrier selection circuitry initially selects subcarriers for the active set having an effective subcarrier noise power below a predetermined threshold.

17. The communication station of claim 14 wherein the subcarrier selection circuitry initially selects substantially all subcarriers to be in the set of active subcarriers.

18. The communication station of claim 14 wherein the subcarrier selection circuitry sets the power level of each subcarrier of the active set to a total transmit power divided by the number of the active subcarriers, the total transmit power being an actual transmit power level used for transmitting a current packet to the communication station a service field of a current packet.

19. The communication station of claim 14 wherein the subcarrier selection circuitry sets the power level of each subcarrier of the active set based on a transmitter power budget divided by the number of the active subcarriers, the transmitter power budget being an available transmitter power of a transmitting station.

20. The communication station of claim 14 wherein the subcarrier selection circuitry sets the power level of each subcarrier of the active set based on a maximum power spectral density, wherein the maximum power spectral density is predetermined by a regulating authority.

21. The communication station of claim 14 wherein the radio-frequency circuitry comprises receiver circuitry to determine channel state information for the multicarrier communication channel, the channel state information comprising at least the effective subcarrier noise power for either individual subcarriers or groups of subcarriers.

22. The communication station of claim 14 wherein the radio-frequency circuitry comprises transmitter circuitry to send instructions including the selected set of active subcarriers, the selected power level, the selected modulation level and the selected coding rate to a transmitting station for use in transmitting a next packet.

23. The communication station of claim 22 wherein the radio-frequency circuitry comprises receiver circuitry to receive the next packet from the transmitting station, the next packet having been transmitted using the selected active set of subcarriers in accordance with the selected power level, the selected modulation level and the selected coding rate.

24. The communication station of claim 13 wherein the subcarrier selection circuitry calculates the channel capacity by summing individual subcarrier capacities of each subcarrier in the active set, wherein the subcarrier selection circuitry calculates the individual subcarrier capacities based on the set power level divided by an effective subcarrier noise power for an associated subcarrier of the active set.

25. The communication station of claim 13 wherein the multicarrier communication channel comprises either a standard-throughput channel or a high-throughput communication channel, the standard-throughput channel comprising one subchannel, the high-throughput channel comprising a combination of one or more subchannels and one or more spatial channels associated with each subchannel.

26. A system comprising:

a substantially omnidirectional antenna;

radio-frequency circuitry coupled to the antenna to communicate radio frequency signals over a multicarrier communication channel comprising a plurality of subcarriers; and subcarrier selection circuitry to select a set of active subcarriers of the plurality by decreasing a number of the active subcarriers in the set and increasing a power level of remaining active subcarriers of the set to achieve a highest channel capacity, wherein the subcarrier selection circuitry, as part of selection of the set of active subcarriers, is configured to:

calculate a mean effective subcarrier capacity based on effective subcarrier capacities for the active subcarriers;

determine a first modulation level and first coding rate that provides an upper data rate at least slightly greater than the mean effective subcarrier capacity;

determine a second modulation level and second coding rate that provides a lower data rate at least slightly less than the mean effective subcarrier capacity;

calculate a first number of the active subcarriers with capacities higher than the upper data rate;

calculate a second number of the active subcarriers with capacities lower than the lower data rate;

select the first modulation level and the first coding rate associated with the upper data rate when a difference between the first and second numbers is greater than a predetermined percentage of the active subcarriers; and select the second modulation level and the second coding rate associated with the lower data rate when a difference between the first and second numbers is less than or equal to a predetermined percentage of the active subcarriers.

27. A computer-readable medium that stores instructions, which when executed by one or more processors, cause the processors to perform operations comprising:

selecting a set of active subcarriers of a multicarrier communication channel;

setting a power level for each subcarrier of the set based on a number of the active subcarriers;

calculating a channel capacity based on the power level and an effective subcarrier noise power for each active subcarrier;

decreasing the number active subcarriers in the set and re-performing the setting and calculating to determine a final set of active subcarriers that provide a highest calculated channel capacity; and selecting a modulation level and a coding rate for the subcarriers of the active set by:

determining a first modulation level and first coding rate that provides an upper data rate at least slightly greater than the mean effective subcarrier capacity;

determining a second modulation level and second coding rate that provides a lower data rate at least slightly less than the mean effective subcarrier capacity;

calculating a first number of the active subcarriers with capacities higher than the upper data rate;

calculating a second number of the active subcarriers with capacities lower than the lower data rate;

selecting the first modulation level and the first coding rate associated with the upper data rate when a difference between the first and second numbers is greater than a predetermined percentage of the active subcarriers; and selecting the second modulation level and the second coding rate associated with the lower data rate when a difference between the first and second numbers is less than or equal to a predetermined percentage of the active subcarriers.

28. The computer-readable medium of claim 27 wherein the instructions, when further executed by one or more of the processors cause the processors to perform operations, setting the power level further comprises increasing the power level of each active subcarrier after removing one or more subcarriers from the active set to maintain a predetermined power-spectral density; and sorting the subcarriers based on an effective subcarrier noise power, wherein decreasing the number of active subcarriers in the set comprises removing one of the subcarriers having the next greatest effective subcarrier noise power from the set of active subcarriers prior to resetting the power levels of the remaining subcarriers and recalculating the channel capacity.

* * * * *

UNITED STATES PATENT AND TRADEMARK OFFICE
CERTIFICATE OF CORRECTION

PATENT NO. : 7,570,953 B2  Page 1 of 1
APPLICATION NO. : 10/862535
DATED : August 4, 2009
INVENTOR(S) : Maltsev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Seventh Day of September, 2010

David J. Kappos
*Director of the United States Patent and Trademark Office*